(12) United States Patent
Van Oers et al.

(10) Patent No.: US 8,465,180 B2
(45) Date of Patent: Jun. 18, 2013

(54) OPTICAL ELEMENT FOR ASYMMETRIC LIGHT DISTRIBUTION

(75) Inventors: Denis Joseph Carel Van Oers, Eindhoven (NL); Rob Franciscus Maria Van Elmpt, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 411 days.

(21) Appl. No.: 12/992,102

(22) PCT Filed: May 13, 2009

(86) PCT No.: PCT/IB2009/051962
§ 371 (c)(1),
(2), (4) Date: Nov. 11, 2010

(87) PCT Pub. No.: WO2009/141762
PCT Pub. Date: Nov. 26, 2009

(65) Prior Publication Data
US 2011/0080730 A1 Apr. 7, 2011

(30) Foreign Application Priority Data
May 20, 2008 (EP) .................... 08156533

(51) Int. Cl.
*F21V 5/04* (2006.01)
*F21V 5/08* (2006.01)

(52) U.S. Cl.
USPC ........... 362/311.08; 362/311.06; 362/311.12; 362/311.02; 362/336

(58) Field of Classification Search
USPC ............ 362/311.02, 311.06, 311.08, 311.12, 362/335–338, 307–310, 235, 361, 329; 359/641, 359/642
See application file for complete search history.

(56) References Cited

U.S. PATENT DOCUMENTS

| | | | |
|---|---|---|---|
| 7,674,018 B2 * | 3/2010 | Holder et al. ............ | 362/311.06 |
| 7,918,583 B2 * | 4/2011 | Chakmakjian et al. ....... | 362/240 |
| 7,942,559 B2 * | 5/2011 | Holder et al. ............ | 362/311.06 |
| 2002/0080615 A1 * | 6/2002 | Marshall et al. .............. | 362/333 |

* cited by examiner

*Primary Examiner* — Bao Q Truong
(74) *Attorney, Agent, or Firm* — Mark L. Beloborodov

(57) ABSTRACT

The present invention relates to an optical element (2) for collimating light from a light source (3), said optical element (2) having an in-coupling side (5) arranged to receive said light, an out-coupling side (6) arranged to allow for emission of collimated light, and an element body extending from said in-coupling side (5) to said out-coupling side (6), the element body having a cross-section perpendicular to an optical axis (z) defined by an x-5 axis and a y-axis being perpendicular to each other, wherein said optical element (2) has an x-curvature along said x-axis and a y-curvature along said y-axis, said y-curvature being greater than said x-curvature, thereby enabling for a light distribution of said collimated light emitted from said out-coupling side (6) to have a cross-section of an asymmetric shape (CE) perpendicular to said optical axis (z). The present invention also relates to a lighting system (1) comprising such an optical element (2). An advantage with the present invention is that it may provide asymmetric light distribution with an increased beam-width difference in two perpendicular viewing directions.

9 Claims, 5 Drawing Sheets

OPTICAL ELEMENT FOR ASYMMETRIC LIGHT DISTRIBUTION

FIELD OF THE INVENTION

The present invention relates to an optical element for collimating light beams from a light source, which optical element has an in-coupling side arranged to receive the light beams, an out-coupling side arranged to allow for emission of collimated light, and an element body extending from the in-coupling side to the out-coupling side.

The present invention also relates to a lighting system comprising such an optical element.

DESCRIPTION OF THE RELATED ART

Recently, much progress has been made in increasing the brightness of light-emitting diodes (LEDs). As a result, LEDs have become sufficiently bright and inexpensive to serve as a light source in for example lighting system such as lamps with adjustable color, direct view Liquid Crystal Displays (LCDs) and in front and rear projection displays. By mixing and controlling the intensity of differently colored LEDs, e.g. red, green and blue LEDs, any number of colors can be generated, e.g. white.

In order to influence the direction of the often widely spread emitted light, an optical element with collimating characteristics is commonly arranged in conjunction with the LED(s). Utilizing a collimator enables for instance the direction of the light to become more aligned in a specific direction, or the spatial cross-section of the light to become smaller. U.S. Pat. No. 5,555,329, for instance, describes a light directing optical structure for use together with a light source forming a lighting system, which relates to redirecting light in a desired direction. The structure provides control of the light distribution, both in intensity and direction, along two perpendicular viewing axes, with the use of prisms. However, the disclosed light directing optical structure only allows a limited beam-width difference in the two viewing directions.

In order to further influence the optical effect, such as the beam-width, a frosting or a lens structure is commonly applied on the emitting surface of the collimator. For example, to accomplish a relatively narrow light beam (or ray) perpendicular to one viewing axis and a wider beam along a perpendicular viewing axis, a cylindrical lens structure may be utilized. However, a cylindrical lens structure can generally only provide a 10° to 20° wider beam in the first viewing direction as compared to the second perpendicular viewing direction. A further difference in beam angle would lead to lower efficiency of a lighting system using such an optical structure.

Consequently, there is a need for a novel arrangement for providing asymmetric light distribution with an increased beam-width difference in two perpendicular viewing directions.

SUMMARY OF THE INVENTION

It is therefore an object of the present invention to provide an optical element which arrangement at least alleviates at least one of the problems of the prior art.

According to the invention, the above object is met by an optical element for collimating light from a light source, said optical element having an in-coupling side arranged to receive said light, an out-coupling side arranged to allow for emission of collimated light, and an element body extending from said in-coupling side to said out-coupling side, the element body having a cross-section perpendicular to an optical axis (z) defined by an x-axis and a y-axis being perpendicular to each other, wherein said optical element has an x-curvature along said x-axis and a y-curvature along said y-axis, said y-curvature being greater than said x-curvature, thereby enabling for a light distribution of said collimated light emitted from said out-coupling side to have a cross-section of an asymmetric shape perpendicular to said optical axis (z).

With the x-axis and the perpendicular y-axis of the optical element having different curvatures meanwhile preferably fulfilling total internal reflection (TIR) conditions, the present invention thus enables for collimated light to be emitted with an asymmetric cross-section. That is, from the out-coupling side emitted collimated light is enabled to form a light distribution for which a cross-section at an arbitrary, not necessarily any, distance from the optical element perpendicular to the z-axis has an asymmetric shape, preferably elliptic. An elliptic shape is in the context of this application to be understood in a broad sense, likewise including essentially elliptic shapes, which are perceived to be elliptic. Also, it should be noted that the expressions light, light beams and light rays have equivalent meaning.

It should be noted that the expression asymmetric in the sense of this invention defines a shape that is asymmetric with respect to the x- and y-axis, e.g. an elliptic shape. The asymmetric or for some embodiments elliptic shape may be desirable in applications where an asymmetric rather than a symmetric light distribution is more efficient. For example, to efficiently illuminate a horticulture arrangement with plants in long rows, a light distribution having a narrow beam-width in one viewing direction and a wider beam-width in a perpendicular viewing direction is desirable. By arranging one, or preferred a plurality, of optical elements in a matrix illumination system, the horticulture arrangement may be illuminated with high efficiency through high uniformity. Preferably, the optical element of the present invention may be comprised in a lighting system, which also comprises a light source. In such a lighting system, the in-coupling side of the optical element is adapted to receive light emitted by the light source, which may be a LED.

The shape of the optical element, such as the x- and y-curvatures, are chosen as dependent parameters, and preferably with a relation resulting in optimal efficiency. For instance, the x- and y-curvatures may be defined in relation to each other such that a maximum diverging angle of the light along the x-axis is at least 15 degrees, and preferably at least 30 degrees, greater than a corresponding maximum diverging angle along the y-axis.

Thus, with the possibility of such extensive beam-width differences in two perpendicular viewing directions, the present invention enable more efficient light distribution for applications requesting such functionality.

Preferably, the optical element is arranged such that it enables the shape of the cross-section of the light distribution emitted from the out-coupling side to have a greater width along the x-axis than along the y-axis. In this manner, the proportions of x- and y-curvatures along the x- and y-axes defining the preferably elliptic shape of the emitted collimated light distribution are inverted in comparison to the curvatures defining the optical element. In other words, when illuminating the optical element having a y-curvature greater than an x-curvature, the x-curvature of the ellipse of the emitted collimated light distribution will be greater than the corresponding y-curvature. That is, meanwhile the optical element is wider in a y-direction, the elliptic shape of the collimated light distribution will be wider in an x-direction.

Designing the optical element such that the emitted curvatures are inverted represents a relatively uncomplicated construction.

The out-coupling side of the optical element may be designed in different manners. Its surface may be flat, e.g. smooth and planar, which makes the optical element relatively simple, or it may optionally comprise a frosting surface, which thereby enables tuning of the beam-width. To even further influence the optical effect, the out-coupling side may comprise a lens structure. Providing the optical element with a cylindrical lens structure may result in an additional light divergence in the direction perpendicular to the cylinder axes, i.e. the axes at the cylindrical lens. A cylindrical lens may thus be used for tuning collimated light emitted from the out-coupling side towards the desired beam-width.

The optical element, which may be a collimator, is furthermore preferably solid and transparent. It may be formed of, or a combination of, Poly Carbonate (PC) or Poly Methyl Metacrylate (PMMA). However, the skilled person understands that the optical element also may be semi-transparent or even colored, and may be formed using other suitable materials.

As has been described above, the optical element of the present invention consequently provides an asymmetric light distribution with an increased beam-width difference in two perpendicular viewing directions. It should however be noted, that collimated light emitted from the out-coupling side of the optical element may have other shapes than the asymmetric shapes described. For instance, should more curvatures than the mentioned x- and y-curvatures be defined to be divergent, more complex light distribution cross-sections perpendicular to the optical axis of the collimated light emitted from the out-coupling side are possible.

BRIEF DESCRIPTION OF THE DRAWINGS

These and other aspects of the present invention will now be described in more detail, with reference to the appended drawings showing currently preferred embodiments of the invention, in which.

DETAILED DESCRIPTION OF CURRENTLY PREFERRED EMBODIMENTS

Figure 1:
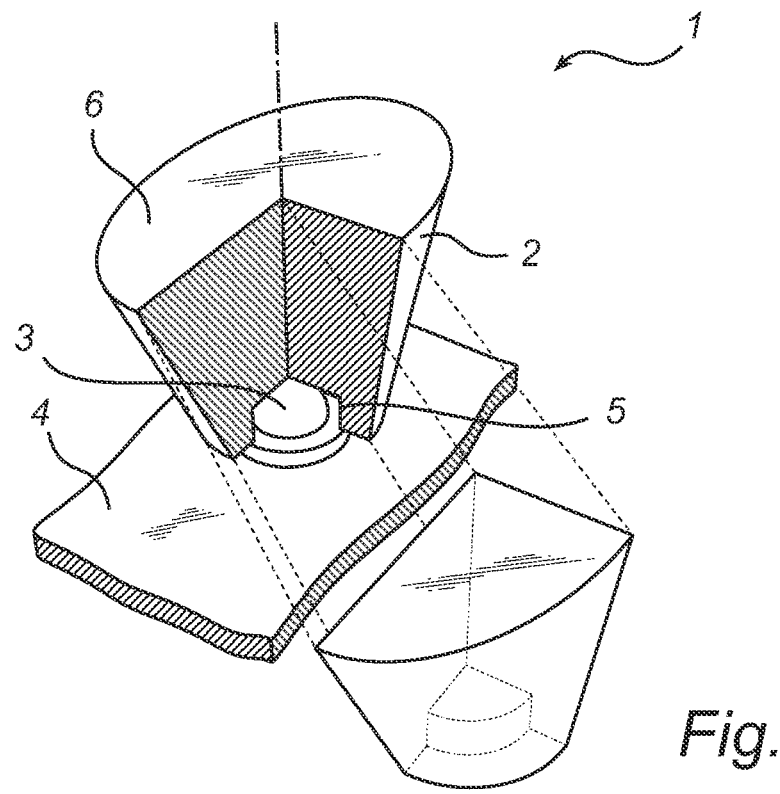
FIG. 1 is a block diagram illustrating a lighting system according to a preferred embodiment of the present invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

FIG. 1 is a three-dimensional illustration of a lighting system 1 in accordance with an exemplifying embodiment of the present invention. The system 1 comprises a mounting housing 4 onto which a light source 3 covered by an optical element 2 is mounted. The light source 1 in the shown embodiment is a LED, but the invention is however not restricted thereto. The optical element 2 is in the example a collimator, although the scope of the invention likewise covers other applicable alternatives. The collimator 2 of FIG. 1 is as preferred although not necessary solid and transparent. Here, the collimator 2 comprises Poly Carbonate (PC) with a refractive index of 1.58. Other applicable materials are likewise feasible, such as Poly Methyl Metacrylate (PMMA) having a refractive index of 1.49, or a combination of PC and PMMA. With a refractive index of the collimator 2 higher than the medium surrounding it, preferably air with a refractive index of 1.0, the collimator 2 consequently provides the commonly known optical phenomenon total internal reflection (TIR) for light received from the LED 3.

The collimator 2 of the exemplifying embodiment has an in-coupling side 5 covering the LED 3, whereby the collimator 2 is arranged to receive the light provided from the LED 3. In the opposite end, the collimator 2 has an out-coupling side 6 arranged to allow for emission of collimated light. As mentioned above, it should be noted that the expressions light, light beams and light rays have equivalent meaning.

Figure 2A:
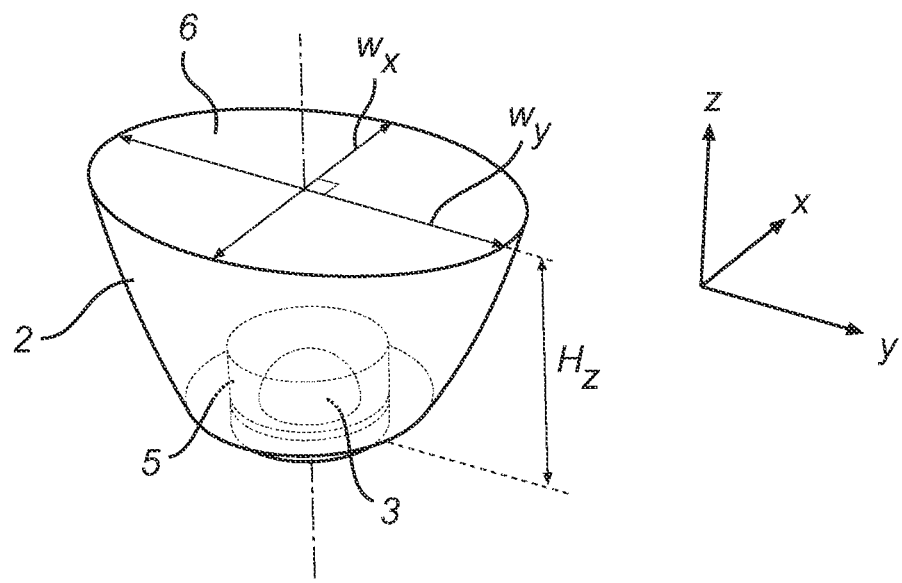
FIG. 2a provides a detailed view of the collimator of the embodiment shown in FIG. 1.

In FIG. 2a, a more detailed view of the collimator 2 of FIG. 1 is shown. As is depicted, the collimator 2 has a shape different from commonly known collimators in that at least one arbitrary cross-section perpendicular to an optical axis, z-axis, of the shown collimator 2 is not circular. In accordance with the present invention the curvature along such a cross-section is subsequently not constant, but rather asymmetric. A cross-section anywhere perpendicular to the z-axis is defined by x- and y-axes, which are perpendicular to each other. In the exemplary embodiment, the curvature of the collimator 2 along the y-axis, referred to as the y-curvature, is greater than the curvature along the x-axis, referred to as the x-curvature. Consequently, this results in cross-sections having oval shapes perpendicular to the z-axis, with widths $W_y$ along the y-axis being wider than widths $W_x$ along the x-axis. In the shown example, a height $H_z$ of the collimator 2 is 5.5 mm and the width dimensions $W_y$, $W_x$ at the out-coupling side 6 are 14 mm and 10 mm, respectively. Note however that other dimensions of course are feasible. The dimensions, such as the x- and y-curvatures, are dependent parameters and preferably chosen to comply with TIR, meanwhile supporting sought after asymmetric light distribution with an increased beam-width difference in two perpendicular viewing directions.

Figure 2B:
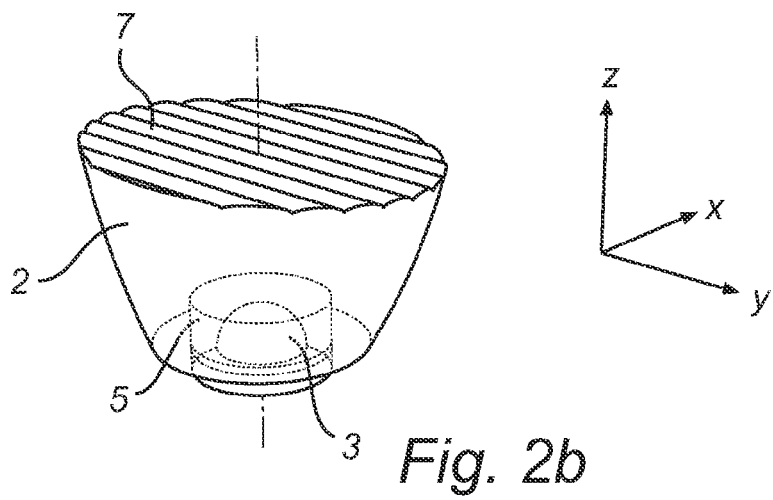
FIG. 2b shows the collimator of FIG. 2a, having an alternative out-coupling side comprising a lens structure.

The out-coupling side 6 of the collimator 2 is in the exemplary embodiment flat with a smooth surface and, preferably, perpendicular to the z-axis. The out-coupling side may however optionally comprise a frosting surface, additionally affecting the optical characteristics of the collimator 2. Another alternative is, as shown in FIG. 2b, to let the out-coupling side of the collimator 2 comprise a lens structure 7. The shown lens structure of FIG. 2b is cylindrical, thereby supporting additional light divergence along the x-axis, i.e. in the direction perpendicular to the cylinder axes (y-axis), of light being emitted there through.

Figure 3:
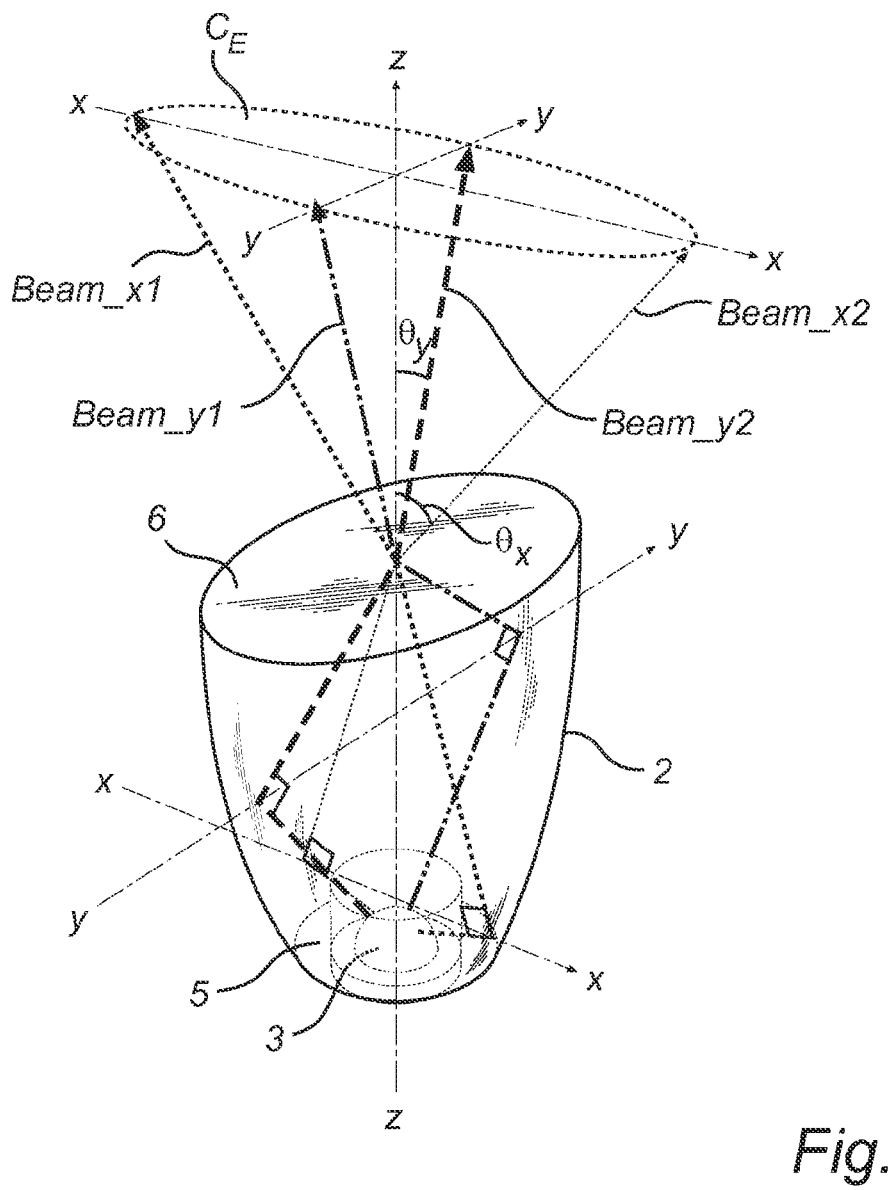
FIG. 3 illustrates diverging angles of light traveling in xz- and yz-planes in the exemplifying lighting system of the preferred embodiment.

In use, the collimator 2 of the exemplary embodiment receives light from the LED 3. FIG. 3 illustrates how exemplifying light beam_x1, beam_x2, beam_y1, beam_y2 travel from the LED 3 to the in-coupling side 5 of the collimator 2, through the collimator 2, and escape through out-coupling side 6 as collimated light. beam_x1, for instance, travels from the LED 3 through the in-coupling 5 in an xz-plane, and is when it reaches the boundary of the collimator 2 as a result of TIR reflected towards the out-coupling side 6, where it passes through. As a result of the commonly known law of refraction, i.e. since the medium on the other side of the out-coupling side 6 boundary has a differing refractive index, the velocity of the light beam beam_x1 (i.e. speed of light) changes, and the light beam beam_x1 escapes the out-coupling side 6 at an angle $\theta_x$ from the z-axis. In the same manner, beam_y1 travels in the yz-plane, and passes the out-coupling side 6 at an angle $\theta_y$. The from the out-coupling side 6 emitted plurality of collimated light, among them the illustrated light beam$x_{-x1,\ beam}$_x2, beam_y1, beam_y2, form a light distribution for which a cross-section at an arbitrary distance from the collimator 2 perpendicular to the z-axis has an elliptic shape $C_E$. Note that the elliptic shape may likewise be an essentially elliptic shape, which is perceived to be elliptic. In the example illustrated in FIG. 3, the elliptic shape $C_E$ of the collimated light distribution has a greater width along the x-axis than along the y-axis. The proportions of x- and y-curvatures along the x- and y-axes defining the elliptic shape $C_E$ of the collimated light distribution are thus inverted in comparison to the curvatures defining the optical element 2. That is, meanwhile the collimator 2 is wider in a y-direction, the elliptic shape $C_E$ of the collimated light distribution is wider in an x-direction.

The extent to which x- and y-curvatures of the collimator 2 are curved perpendicular to the z-axis naturally influences the extent to which the x- and y-curvatures of a cross-section $C_E$ of the collimated light distribution perpendicular to the z-axis are curved. In the shown embodiment, the x- and y-curvatures of the collimator 2 has a relationship such that a maximum diverging angle $\theta_x$ of the light beam_x1, beam_x2 in the xz-plane is approximately 30-35° greater than a maximum diverging angle $\theta_y$ of the light beam_y1, beam_y2 in the yz-plane. In other words, the emitted light distribution has a beam-width differences in two perpendicular viewing directions, i.e. along the x- and y-axes, respectively, corresponding to a maximum diverging angle difference of approximately 30-35°. In defining the x- and y-curvatures of the collimator 2 in relation to each other, i.e. widths $W_x$ and $W_y$, the corresponding desired x- and y-curvatures defining the elliptic shape $C_E$ of the emitted collimated light distribution may subsequently be defined. Although in the exemplary embodiment the maximum diverging angle $\theta_y$ is 30-35° greater than a maximum diverging angle $\theta_y$, the present invention is not restricted thereto. For some applications, a maximum diverging angle difference of 15° or perhaps 25° may be desirable. Note that provision of a frosting surface or a lens structure 7 on the out-coupling side 6 of the collimator 2 may, as previously mentioned, provide additional tuning of the beam-widths.

Figure 4A:
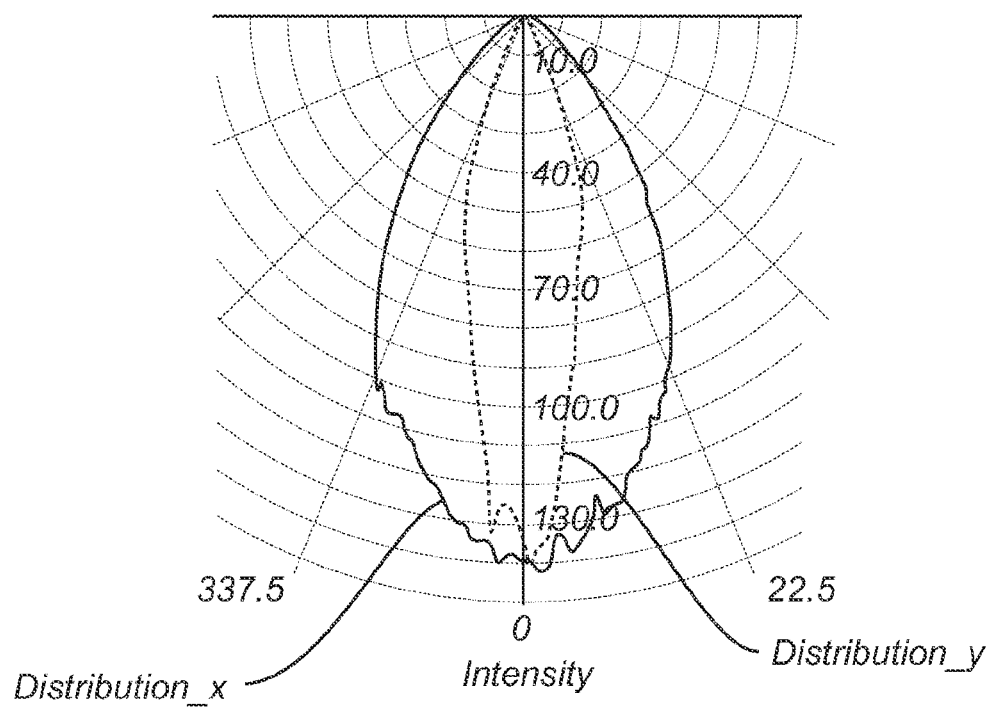
FIGS. 4a to 4d illustrate graphs of polar distribution, Cartesian distribution, polar contour plot and Cartesian contour plot, showing a typical light distribution emitted from the lighting system of the embodiment of FIG. 1.
Figure 4B:
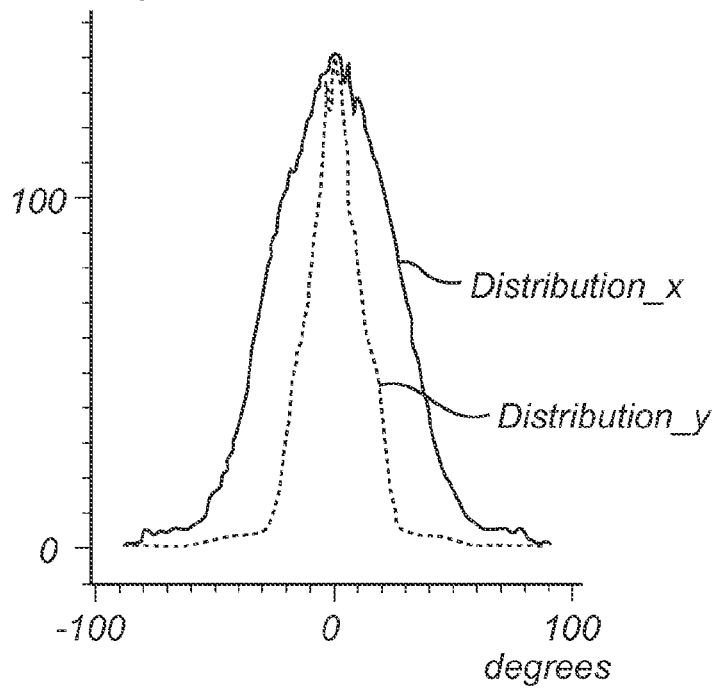
Figure 4C:
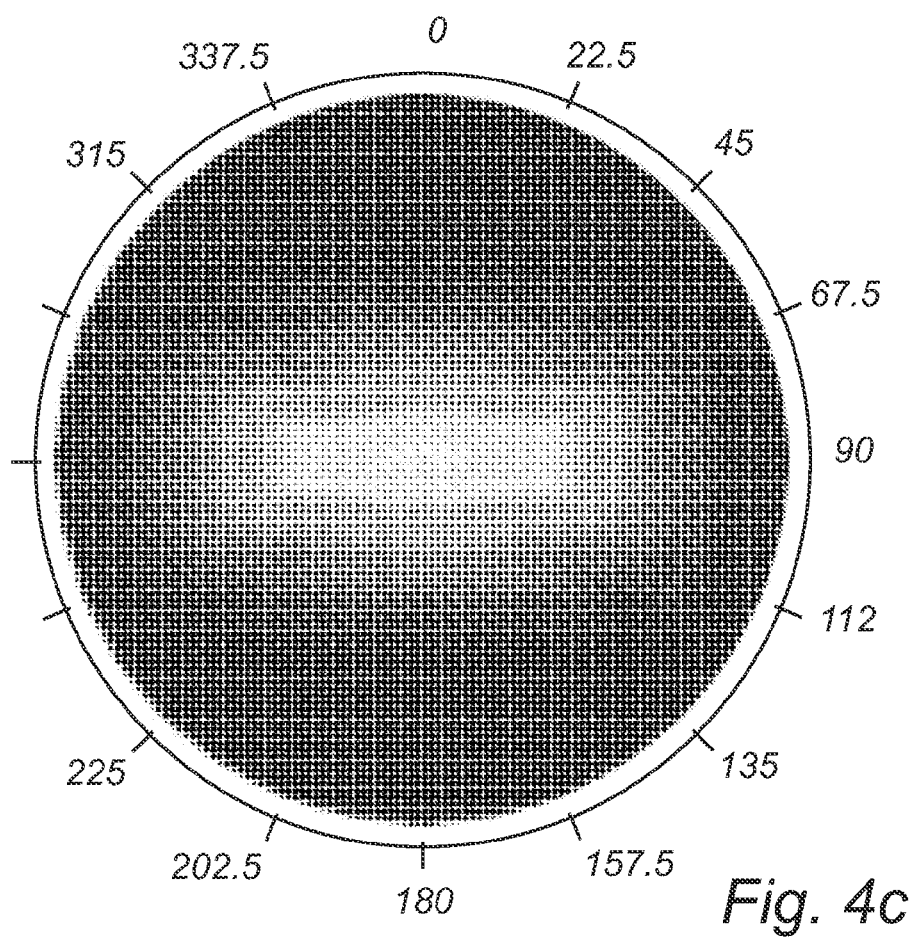
Figure 4D:
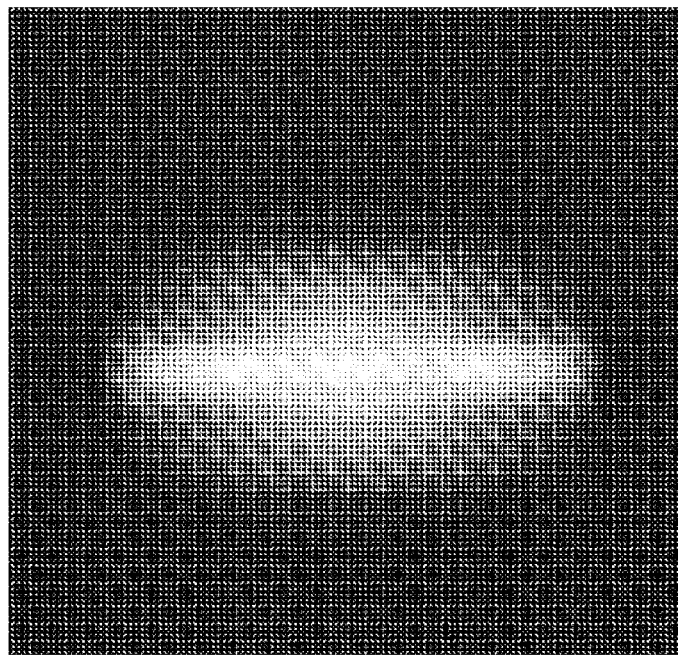
Figure 5:
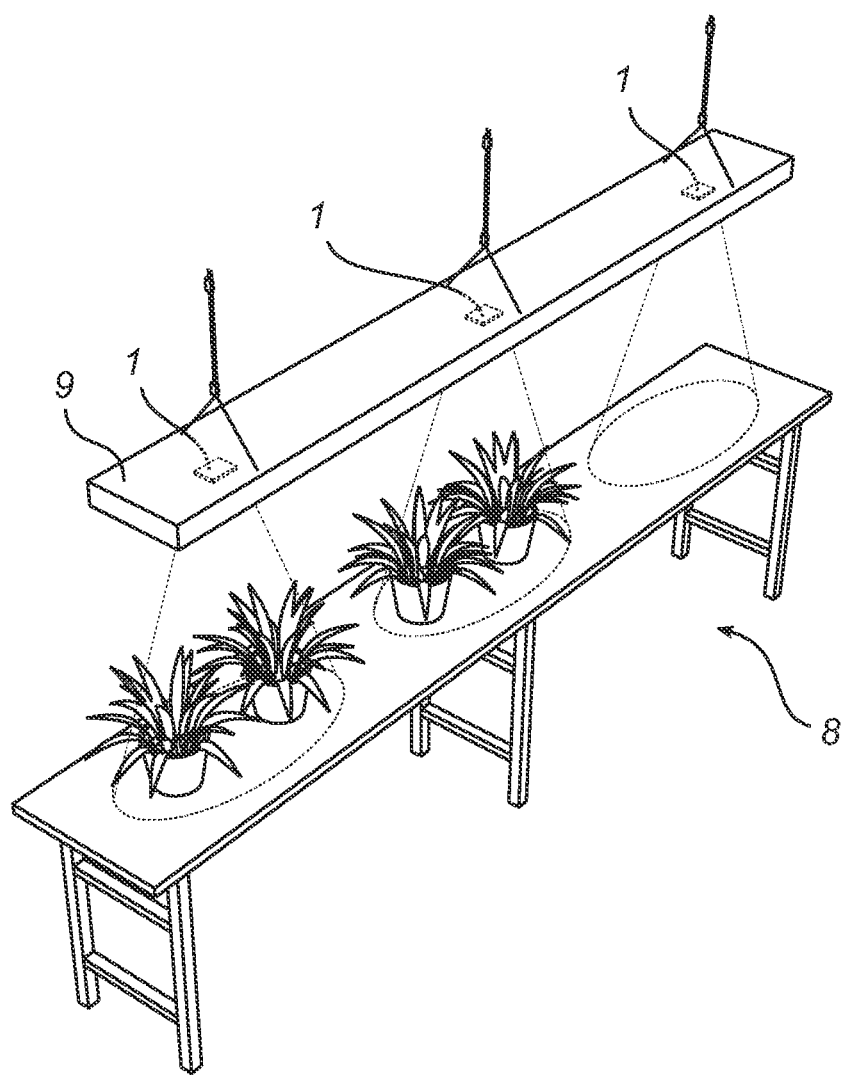
FIG. 5 shows an exemplifying implementation of the preferred embodiment, in use in a matrix illumination for a horticulture arrangement.

FIGS. 4a to 4d show graphs of the emitted collimated light distribution of the exemplary embodiment. FIG. 4a illustrates polar light distribution, distribution_x, distribution_y, in the respective x and y viewing directions with intensity as a function of angle, and FIG. 4b similarly illustrates the Cartesian light distribution. Corresponding polar and Cartesian contour plots of the emitted collimated light distribution are illustrated in FIGS. 4c and 4d, respectively.

In order to illustrate a feasible application for the exemplary embodiment shown in FIGS. 1 to 4, FIG. 5 depicts a plurality of lighting systems 1 comprised in a matrix illumination system 9. The matrix illumination system 9 is provided to illuminate a horticulture arrangement 8, which extend in a lengthwise direction meanwhile having a relatively narrow width. For illumination of such an arrangement 8, provision of an extensive beam-width difference in two perpendicular viewing directions is effective. As illustrated, the plurality of lighting systems 1 each comprises a collimator 2 in accordance with the present invention. Consequently it is possible to provide an optimal light distribution, in that the horticulture arrangement 8 may be illuminated with high efficiency through high uniformity.

In the exemplary embodiment of the present invention described above, the light source is a LED. It would however be possible, and within the scope of the present invention, to use different types of light source, for example different types of solid-state light sources known in the art. Likewise is it possible to use a plurality of light sources.

Furthermore, the skilled addressee realizes that the present invention by no means is limited to the preferred embodiments described above. On the contrary, the skilled addressee understands that many modifications and variations are possible and within the scope of the appended claims. For instance, a collimated light distribution emitted from the out-coupling side of the optical element may have other shapes than elliptic. For instance, should more curvatures than the mentioned x- and y-curvatures be defined to be divergent, more complex light distribution cross-sections perpendicular to the z-axis of the collimated light emitted from the out-coupling side, are possible.

The invention claimed is:

1. Optical element for collimating light from a light source, said optical element having an in-coupling side arranged to receive said light and an out-coupling side arranged to allow for emission of collimated light, said optical element comprising
    a substantially transparent or translucent element body extending from said in-coupling side to said out-coupling side, the element body having a cross-section perpendicular to an optical axis (z) defined by an x-axis and a y-axis being perpendicular to each other,
    wherein said element body has an x-curvature along said x-axis and a y-curvature along said y-axis, said y-curvature being greater than said x-curvature, thereby enabling for a light distribution of said collimated light emitted from said out-coupling side to have a cross-section of an asymmetric shape ($C_E$) perpendicular to said optical axis (z),
    wherein a refractive index of the element body is higher than a medium surrounding it and the x- and y-curvatures are selected to achieve a total internal reflection (TIR).

2. Optical element according to claim 1, wherein a light distribution of said collimated light emitted from said out-coupling side has a cross-section of an elliptic shape ($C_E$) perpendicular to said optical axis (z).

3. Optical element according to claim 1, wherein said elliptic shape ($C_E$) has a greater width along said x-axis than along said y-axis.

4. Optical element according to claim 1, wherein said x- and y-curvatures in relation to each other are defined such that a maximum diverging angle ($\theta_x$) of said light beams along said x-axis, is at least 15 degrees greater than a corresponding maximum diverging angle ($\theta_y$) along said y-axis.

5. Optical element according to claim 1, wherein said optical element comprises poly carbonate and/or polymethylmetacrylate.

6. Optical element according to claim 1, wherein said out-coupling side is substantially flat.

7. Optical element according to claim 1, wherein said out-coupling side comprises a lens structure.

8. A lighting system comprising an optical element according to claim 1 and a light source, wherein said in-coupling side of the optical element is adapted to receive light emitted by the light source.

9. The lighting system according to claim 8, wherein said light source comprises at least one light emitting diode (LED).

* * * * *